United States Patent
Bauch et al.

(10) Patent No.: US 12,304,513 B2
(45) Date of Patent: May 20, 2025

(54) METHOD, DEVICE, COMPUTER PROGRAM AND COMPUTER PROGRAM PRODUCT FOR OPERATING A DRIVER ASSISTANCE FUNCTION OF A VEHICLE

(71) Applicant: Bayerische Motoren Werke Aktiengesellschaft, Munich (DE)

(72) Inventors: Dominik Bauch, Muehldorf am Inn (DE); Marco Baumgartl, Gilching (DE); Michael Himmelsbach, Munich (DE); Josef Mehringer, Gmund (DE); Daniel Meissner, Friedberg (DE); Luca Trentinaglia, Eichenau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 371 days.

(21) Appl. No.: 17/428,861

(22) PCT Filed: Oct. 25, 2019

(86) PCT No.: PCT/EP2019/079226
§ 371 (c)(1),
(2) Date: Aug. 5, 2021

(87) PCT Pub. No.: WO2020/160799
PCT Pub. Date: Aug. 13, 2020

(65) Prior Publication Data
US 2022/0089171 A1    Mar. 24, 2022

(30) Foreign Application Priority Data

Feb. 6, 2019    (DE) .................... 10 2019 102 924.4

(51) Int. Cl.
*B60W 50/08*    (2020.01)
*B60W 50/14*    (2020.01)
*B60W 50/00*    (2006.01)

(52) U.S. Cl.
CPC .......... *B60W 50/082* (2013.01); *B60W 50/14* (2013.01); *B60W 2050/0095* (2013.01);
(Continued)

(58) Field of Classification Search
CPC .... B60W 30/06; B60W 30/08; B60W 30/085; B60W 30/09; B60W 30/095;
(Continued)

(56) References Cited

U.S. PATENT DOCUMENTS

| 10,150,410 B2 | 12/2018 | Medenica et al. |
| 2009/0204289 A1* | 8/2009 | Lehre .................... G01S 13/931 701/36 |

(Continued)

FOREIGN PATENT DOCUMENTS

| CN | 102991437 A | 3/2013 |
| CN | 108216264 A | 6/2018 |

(Continued)

OTHER PUBLICATIONS

Sentouh et al., Driver-Automation Cooperation Oriented Approach for Shared Control of Lane Keeping Assist Systems, Jun. 18, 2018, IEEE (Year: 2018).*

(Continued)

*Primary Examiner* — Russell Frejd
*Assistant Examiner* — Sara J Lewandroski
(74) *Attorney, Agent, or Firm* — Crowell & Moring LLP

(57) ABSTRACT

A method for operating a driver assistance function of a vehicle includes determining a position of the vehicle, providing map data of a road map, providing current and historical traffic data depending on the position, providing a list of driver assistance functions, and determining whether a situation exists in which a driver assistance function of the list of driver assistance functions can be used depending on the position, the map data, and the current and historical (Continued)

traffic data. If it is determined that the situation exists, information is provided to a driver of the vehicle to set the driver assistance function.

8 Claims, 1 Drawing Sheet

(52) U.S. Cl.
CPC ... *B60W 2540/215* (2020.02); *B60W 2540/30* (2013.01); *B60W 2552/00* (2020.02); *B60W 2554/00* (2020.02); *B60W 2556/10* (2020.02); *B60W 2556/50* (2020.02)

(58) Field of Classification Search
CPC ......... B60W 30/0953; B60W 30/0956; B60W 30/10; B60W 30/12; B60W 30/14; B60W 30/143; B60W 30/146; B60W 30/16; B60W 30/162; B60W 30/165; B60W 30/17; B60W 30/18; B60W 30/18009; B60W 30/18018; B60W 30/18027; B60W 30/18036; B60W 30/18045; B60W 30/08054; B60W 30/18063; B60W 30/18072; B60W 30/181; B60W 30/18109; B60W 30/18118; B60W 30/18127; B60W 30/18136; B60W 30/18145; B60W 30/18154; B60W 30/1859; B60W 30/1863; B60W 2030/082; B60W 2030/18081; B60W 2030/1809; B60W 40/04; B60W 40/06; B60W 40/064; B60W 40/068; B60W 40/072; B60W 40/076; B60W 40/08; B60W 2050/0002; B60W 2050/0075; B60W 2050/0082; B60W 2050/0095; B60W 2050/0097; B60W 2050/007; B60W 2050/0072; B60W 2050/0073; B60W 2050/0074; B60W 60/00; B60W 60/001; B60W 60/0011; B60W 60/0015; B60W 60/0016; B60W 2556/10; B60W 2556/50; B60W 50/08; B60W 50/082; B60W 50/10; B60W 50/14; B60W 2040/0809; B60W 60/005; B60W 60/0051; B60W 60/0053; B60W 60/0055; B60W 2540/215
See application file for complete search history.

(56) References Cited

U.S. PATENT DOCUMENTS

| | | | |
|---|---|---|---|
| 2013/0226400 A1* | 8/2013 | King | G08G 1/167 701/468 |
| 2014/0200798 A1 | 7/2014 | Huelsen | |
| 2016/0009296 A1* | 1/2016 | Iguchi | B60W 50/14 701/31.4 |
| 2016/0221578 A1 | 8/2016 | Tang et al. | |
| 2017/0282917 A1* | 10/2017 | Pilutti | B60W 30/143 |
| 2018/0105182 A1* | 4/2018 | Kim | G01S 19/42 |
| 2019/0232972 A1* | 8/2019 | Lin | G01C 25/00 |

FOREIGN PATENT DOCUMENTS

| | | | |
|---|---|---|---|
| DE | 100 51 777 A1 | 4/2002 | |
| DE | 10 2006 001 354 A1 | 7/2007 | |
| DE | 10 2011 083 677 A1 | 4/2013 | |
| DE | 10 2011 055 495 A1 | 5/2013 | |
| DE | 10 2013 217 552 A1 | 3/2015 | |
| DE | 10 2017 010 836 A1 | 5/2018 | |
| DE | 10 2017 221 160 A1 | 6/2018 | |
| DE | 10 2017 212 166 A1 | 1/2019 | |
| EP | 3246892 A1 * | 11/2017 | ............ B60W 30/12 |
| WO | WO 99/58358 A1 | 11/1999 | |

OTHER PUBLICATIONS

Sentouh et al., Driver-Automation Cooperation Oriented Approach for Shared Control of Lane Keeping Assist Systems, 2018, IEEE (Year: 2018).*
PCT/EP2019/079226, International Search Report dated Feb. 18, 2020 (Two (2) pages).
German Search Report issued in German application No. 10 2019 102 924.4 dated Jul. 10, 2019, with Statement of Relevancy (Ten (10) pages).
English-language Chinese Office Action issued in Chinese Application No. 201980075113.9 dated Dec. 14, 2023 (6 pages).

* cited by examiner

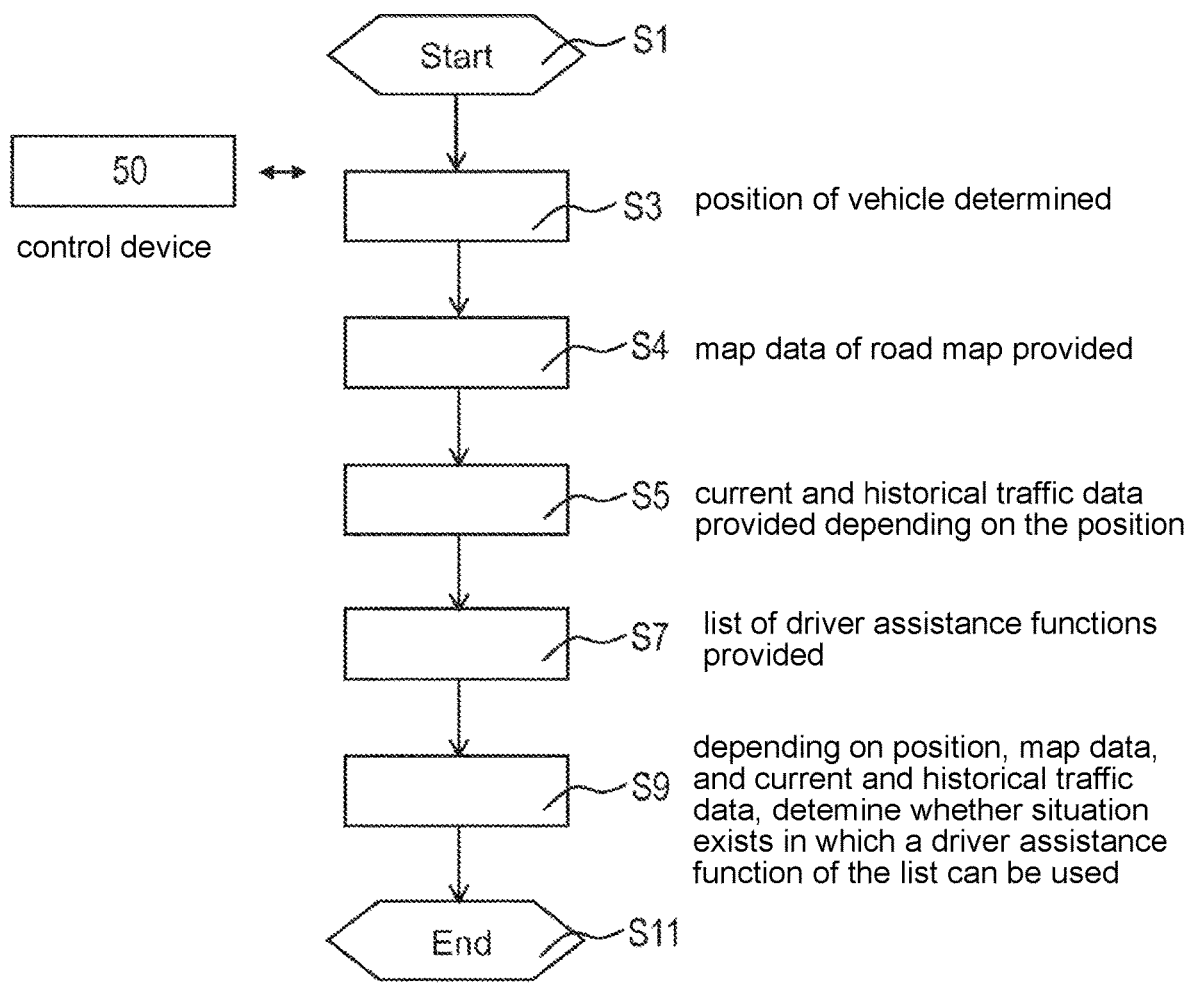

METHOD, DEVICE, COMPUTER PROGRAM AND COMPUTER PROGRAM PRODUCT FOR OPERATING A DRIVER ASSISTANCE FUNCTION OF A VEHICLE

BACKGROUND AND SUMMARY OF THE INVENTION

The invention relates to a method for operating a driver assistance function of a vehicle. The invention also relates to a device for operating a driver assistance function of a vehicle. The invention also relates to a computer program and a computer program product for operating a driver assistance function of a vehicle.

In modern vehicles, many different driver assistance functions are offered. Such driver assistance functions include, for example, a lane-keeping assistant, a lane change assistant, adaptive cruise control and/or a speed control system.

The object underlying the invention is to improve the usefulness of such driver assistance functions.

The invention is characterized by a method for the operation of a driver assistance function of a vehicle. The device is also characterized by a device for operating a driver assistance function of a vehicle, wherein the device is designed to perform the method for the operation of a driver assistance function of a vehicle.

With the method, a position of the vehicle is determined. Map data of a road map are provided. Depending on the position, current and historical traffic data are provided. A list of driver assistance functions is provided. Depending on the position, the map data, and the current and historical traffic data, it is determined whether situation exists in which a driver assistance function of the list can be used. If it has been determined that the situation exists, information is provided to a driver of the vehicle to adjust the driver assistance function.

Since a variety of driver assistance functions can be offered in modern vehicles, it may happen that a driver of the vehicle does not use individual driver assistance functions correctly or does not use them at all, for example, because he does not know at all that the vehicle has this driver assistance function, or because it is too complicated for the driver to use them. By using the position, the map data, current and historical traffic data, it is possible to automatically check whether a driver assistance function of the vehicle can present an advantage or a facilitation for the driver at the moment and can then the information can be provided for using the driver assistance function. This allows driver assistance functions to be automatically proposed or used in a situation-related manner, so that the benefits of the driver assistance function are improved.

The position of the vehicle is, for example, a current position of the vehicle, which can be determined with means of the vehicle.

The map data are, for example, map data of a navigation device of the vehicle and include in particular map data about a predetermined region around the position of the vehicle.

For example, the current and historical traffic data are requested from a service provider or a server and transmitted to the vehicle so that the data can be made available in the vehicle. These data include, for example, information about a current and/or historical traffic density at the position and/or current and/or historical speeds/speed profiles of other vehicles at the position.

For example, the list of driver assistance functions is a list of driver assistance functions that are offered in the vehicle.

The driver assistance functions include, for example, a lane-keeping assistant, a lane change assistant, adaptive cruise control, a speed control system, a cross traffic assistant and/or a side impact assistant.

Determining whether a situation exists in which a driver assistance function of the list can be used includes, for example, the processing of the above indicators, in particular in real time, and an assessment of the usefulness and quality of the driver assistance functions of the list in relation to an actual driving situation.

According to an optional design, historical personal user data are additionally provided depending on the position, which are representative of information about a former setting of a driver assistance function in the vehicle in a region around the position. Alternatively or additionally, historical third-party user data are provided, depending on the position, which is representative of information about a past setting of a driver assistance function in other vehicles in a region around the position. In addition, it is determined whether the situation exists depending on the historical personal user data and/or the historical external user data.

The historical external user data are in particular user data of a vehicle fleet, i.e., a large number of vehicles, which can be requested, for example, from a service provider or a server and transmitted to the vehicle so that they can be made available in the vehicle.

In this way, it can be additionally checked whether the vehicle or other vehicles at the position preferably use certain driver's functions and thus it will be determined even more precisely whether a situation exists in which a driver assistance function of the list can be used in an advantageous manner.

The respective user data include, for example, whether a driver assistance function was activated or deactivated at the position in the respective vehicle and/or the settings with which it was activated. In addition, the respective user data can also include how good a quality of the driver assistance function was at the position.

According to a further optional design, external sensor data of the vehicle are provided. Depending on the position, the map data and the external sensor data, a current traffic situation is determined. In addition, it is determined whether the situation exists depending on the current traffic situation.

In this way, it is also possible to check how the current traffic situation is produced and thus to determine even more precisely whether a situation exists in which a driver assistance function of the list can be used in an advantageous manner.

The external sensor data include, for example, data of an external camera, a radar sensor and/or a lidar sensor.

The current traffic situation includes, for example, driving on a highway/country road/in the city, in dense traffic and/or without other traffic, in stop-and-go traffic, the approach to an exit/access of a highway and similar. However, the current traffic situation may also have information about the state of the road, such as a temporary reduction in road width, the presence of construction sites, temporary road markings and/or temporary road signs and/or the presence or absence of lane markings and/or information about road conditions such as road smoothness, potholes, and the like.

According to a further optional design, road information is provided depending on the position of the vehicle. Depending on the position, the map data and the street information, a current road situation is determined. In addition, it is determined whether the situation exists depending on the current road situation.

Corresponding to the previous design, the road situation can instead be determined depending on external sensor data or in addition to the external sensor data also depending on provided road information. The road information is for example, requested by a service provider or a server and transmitted to the vehicle. For example, the road information corresponds to the above information about the state of the road and/or information about the road conditions.

According to a further optional design, the information for setting the driver assistance function is representative of an indication of a proposal for activating the driver assistance function.

This allows the driver to decide for himself whether or not to use the driver assistance function. For example, the driver can confirm activation with a single click, a gesture, or a voice command, or can ignore the suggestion.

According to a further optional design, the information for setting the driver assistance function is representative of an indication of a proposal for adjusting the driver assistance function.

Adjusting includes, for example, adjusting a braking distance of an adaptive cruise control or other parameters for example threshold values of the cross traffic assistant and/or side impact assistant.

According to a further optional design, the information for setting the driver assistance function is representative of an indication of information that the driver assistance function is activated automatically.

Automatic activation is particularly advantageous for safety-critical driver assistance functions. Furthermore, the driver is not disturbed when driving during automatic activation.

According to a further optional design, the information for setting the driver assistance function is representative of an indication of information that the driver assistance function is automatically adjusted.

According to a further aspect, the invention is characterized by a computer program, wherein the computer program is designed to carry out the method for operating a driver assistance function of a vehicle.

According to a further aspect, the invention is characterized by a computer program product, which comprises an executable program code, wherein when executed by a data processing device the program code performs the method for operating a driver assistance function of a vehicle.

The computer program product comprises, in particular, a medium readable by the data processing device on which the program code is stored.

Exemplary embodiments of the invention are explained in more detail below on the basis of the schematic drawing.

BRIEF DESCRIPTION OF THE DRAWING

FIG. 1 shows a flow diagram of a program for operating a driver assistance function of a vehicle.

DETAILED DESCRIPTION OF THE DRAWING

FIG. 1 shows a flow diagram of a program for the operation of a driver assistance function of a vehicle.

The flow diagram can be carried out in particular by a control device 50. For this purpose, the control device 50 has in particular a computing unit, a program and data memory, as well as, for example, one or more communication interfaces. The program and data memory and/or the computing unit and/or the communication interfaces may be formed in one unit and/or distributed over several units.

The control device 50 can also be referred to as a device for operating a driver assistance function of a vehicle.

In particular, a program for operating the driver assistance function is stored in the program and data memory of the control device 50 for this purpose.

The program is started in a step S1, in which variables can be initialized if necessary.

In a step S3, a position of the vehicle is determined.

The position of the vehicle is, for example, a current position of the vehicle, which can be determined by resources of the vehicle. For example, the position is determined by means of a satellite-based positioning system, such as NAVSTAR GPS, GLONASS, Galileo and/or Beidou.

In a step S4, map data of a road map are provided.

The map data are, for example, map data of a navigation device of the vehicle and include in particular map data about a predetermined region around the position of the vehicle. For example, the map data are stored locally in the vehicle. Alternatively or additionally, they are requested by a service provider or a server, such as a back-end, and transmitted to the vehicle.

In a step S5, current and historical traffic data are provided depending on the position.

For example, the current and historical traffic data are requested by a service provider or a server and transmitted to the vehicle so that the data can be made available in the vehicle. These data include, for example, information about a current and/or historical traffic density at the position and/or current and/or historical speeds/speed profiles of other vehicles at the position.

In a step S7, a list of driver assistance functions is provided.

The list of driver assistance functions, for example, is a list of driver assistance functions that are offered in the vehicle. The driver assistance functions include, for example, a lane-keeping assistant, a lane change assistant, adaptive cruise control, a speed control system, a cross traffic assistant and/or a side impact assistant. For example, the list is stored locally in the vehicle.

In a step S9, depending on the position, the map data, and the current and historical traffic data, it is determined whether a situation exists in which a driver assistance function of the list can be used.

For example, during the determination a current situation is determined depending on the input values provided and this situation is assessed. This means that the benefits and quality of driver assistance functions will be checked for the situation. If one of the driver assistance functions is useful in the situation, in a step 11 information is provided to a driver of the vehicle for setting the driver assistance function. If it has been determined that no driver assistance function can be used, or that no driver assistance function brings a positive benefit, the program is terminated in a step S13.

For example, the information for setting the driver assistance function is representative of an indication of a proposal to activate and/or adjust the driver assistance function.

This allows the driver to decide for himself whether or not to use the driver assistance function. For example, the driver can confirm the activation with a single click, a gesture or a voice command or can ignore the proposal.

Adjusting includes, for example, adjusting a braking distance of an adaptive cruise control, or other parameters, for example threshold values of the cross traffic assistant and/or side impact assistant.

Alternatively, the information for setting the driver assistance function is representative, for example, of an indication of information that the driver assistance function is updated and/or adjusted automatically.

When determining whether a situation exists in which a driver assistance function of the list can be used, in addition to the input variables position, map data and traffic data even more data are used to be able to better assess the situation:

For example, depending on the position, historical personal user data are additionally provided, which are representative of information about a past setting of a driver assistance function in the vehicle in a region around the position. It is additionally determined whether the situation exists depending on the historical personal user data.

The historical personal user data are in particular stored locally in the vehicle and/or are requested from a service provider or a server and transmitted to the vehicle so that they can be made available in the vehicle. The personal user data include, for example, whether a driver assistance function was activated or deactivated in the vehicle at the position and/or the settings with which it was activated.

In addition, the user data may also include how good a quality of the driver assistance function was at the position. For this purpose, the driver assistance function evaluates its respective quality, for example, based on the quality and availability of sensors and environment data on which it depends.

For example, alternatively or additionally and depending on the position, historical third-party user data are provided which are representative of information about a past setting of a driver assistance function in other vehicles in a region around the position. In addition, it is determined whether the situation exists depending on the historical external user data.

The historical external third-party user data are in particular user data of a vehicle fleet, i.e., a large number of vehicles, which are requested, for example, from a service provider or a server and transmitted to the vehicle, so that they can be made available in the vehicle. The respective third-party user data include, for example, whether a driver assistance function was activated in the respective vehicle at the position or was deactivated and/or the settings with which it was activated. In addition, the respective user data can also include how good the quality of the driver assistance function was at the position.

For example, alternatively or additionally external sensor data of the vehicle are provided and/or road information is provided depending on the position of the vehicle. Depending on the position, the map data, and the external sensor data and/or the road information, a current traffic situation is determined. In addition, it is determined whether the situation exists depending on the current traffic situation.

The external sensor data include, for example, data of an external camera, a radar sensor and/or a lidar sensor of the vehicle.

The current traffic situation includes, for example, driving on a highway/country road/in the city, in dense traffic and/or without other traffic, in stop-and-go traffic, the approach of an exit/access of a highway and the like. However, the current traffic situation may also have information about the state of the road, such as a temporary reduction in road width, the presence of construction sites, temporary road markings and/or temporary road signs and/or the presence or absence of lane markings and/or information about road conditions such as smoothness of the road, potholes, and the like.

For example, constant driving on a highway, while following another car at a safe distance, is a perfect situation for activating the adaptive cruise control. For example, when driving on a highway and approaching an access lane, activating a side-impact assistant is very helpful.

For example, the road information is requested from a service provider or a server and transmitted to the vehicle. For example, the road information corresponds to the above information about the state of the road and/or information about the road conditions.

By means of the program described above it can be automatically checked whether a driver assistance function of the vehicle can represent an advantage or a facilitation for the driver at the moment and then the information will be provided for setting the driver assistance function. As a result, driver assistance functions can be automatically proposed or adjusted based on the situation, so that the benefits of the driver assistance function are improved.

What is claimed is:

1. A method for operating a driver assistance function of a vehicle by a control device, comprising the steps of:
    determining a position of the vehicle by a system of the vehicle;
    providing map data of a road map by a navigation device of the vehicle or by a service provider or a server;
    providing current and historical traffic data to the vehicle from the service provider or the server depending on the position;
    providing historical personal user data depending on the position that is stored in the vehicle or is provided to the vehicle by the service provider or the server, wherein the historical personal user data includes whether a driver assistance function in the vehicle was activated or deactivated at the position and wherein the historical personal user data includes how good a quality of an activated driver assistance function was at the position where the driver assistance function evaluates its quality based on a quality and availability of sensors and environmental data on which it depends;
    providing a list of driver assistance functions stored in the vehicle by the control device;
    determining whether a situation exists in which a driver assistance function of the list of driver assistance functions can be used depending on the position, the map data, the current and historical traffic data, and the historical personal user data by the control device;
    if it is determined that the situation exists, providing information to a driver of the vehicle by the control device to set the driver assistance function; and
    activating the driver assistance function by the driver with a click or a gesture or a voice command or ignoring the provided information by the driver.

2. The method according to claim 1 further comprising the steps of:
    providing historical third-party user data depending on the position which are representative of information about a past setting of a driver assistance function in other vehicles in the region around the position; and
    determining whether the situation exists depending on the historical third-party user data.

3. The method according to claim 1 further comprising the steps of:
    providing external sensor data of the vehicle;
    determining a current traffic situation depending on the position, the map data, and the external sensor data; and
    determining whether the situation exists depending on the current traffic situation.

4. The method according to claim 1 further comprising the steps of:
   providing external sensor data of the vehicle;
   determining a current road situation depending on the position, the map data, and the external sensor data; and
   determining whether the situation exists depending on the current road situation.

5. The method according to claim 1 further comprising the steps of:
   providing road information depending on the position of the vehicle;
   determining a current road situation depending on the position, the map data, and the road information; and
   determining whether the situation exists depending on the current road situation.

6. A device for operating a driver assistance function of a vehicle, wherein the device performs the method according to claim 1.

7. A non-transitory computer readable medium having stored thereon program code, wherein the program code performs the method according to claim 1 when executed by a data processing device.

8. The method according to claim 1, wherein the information provided to the driver of the vehicle to set the driver assistance function is representative of an indication of a proposal to the driver of the vehicle for an adjustment of the driver assistance function and wherein the adjustment of the driver assistance function is changing a parameter of the driver assistance function.

* * * * *